Figure 2:
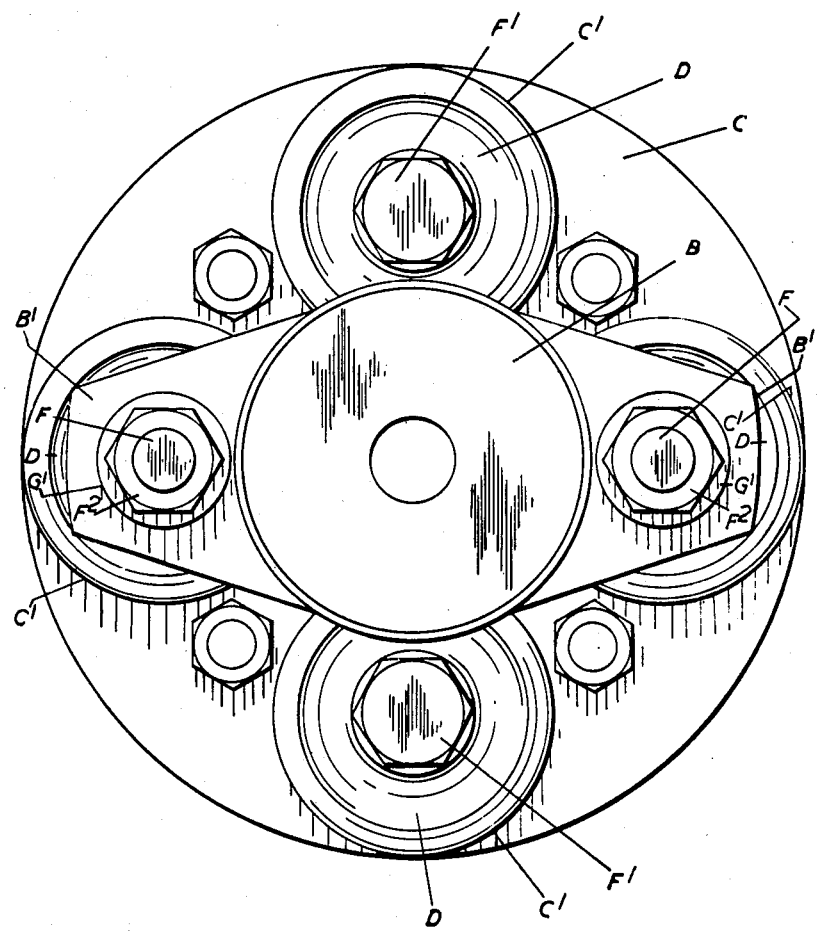

April 24, 1956 S. J. G. GRAHAM 2,742,770
SPIGOT OR DOWEL CONNECTIONS
Filed Oct. 1, 1951 3 Sheets-Sheet 1
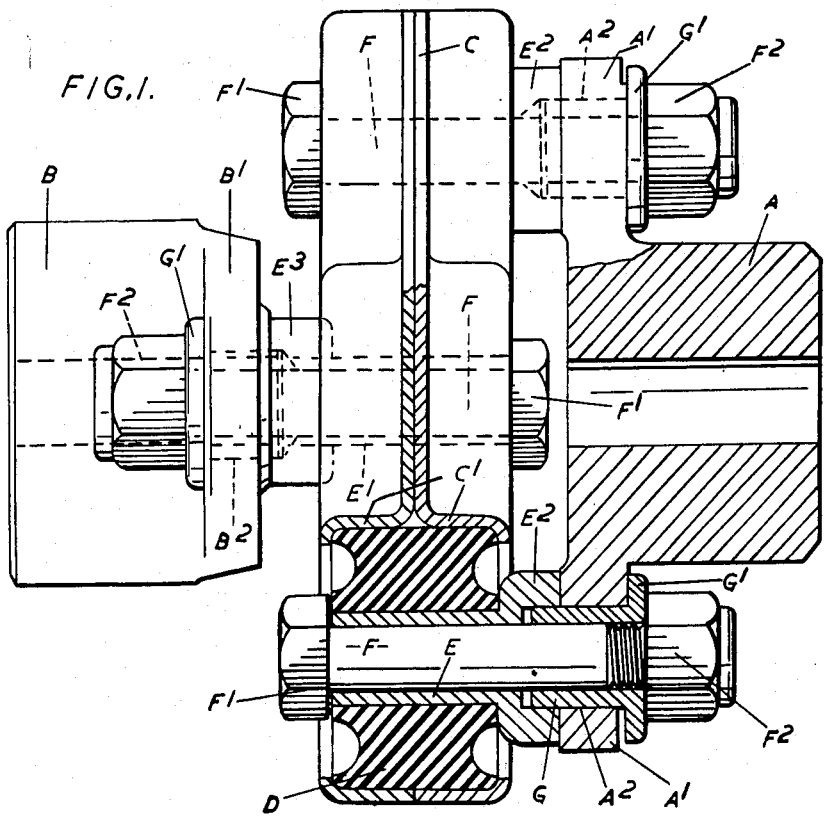
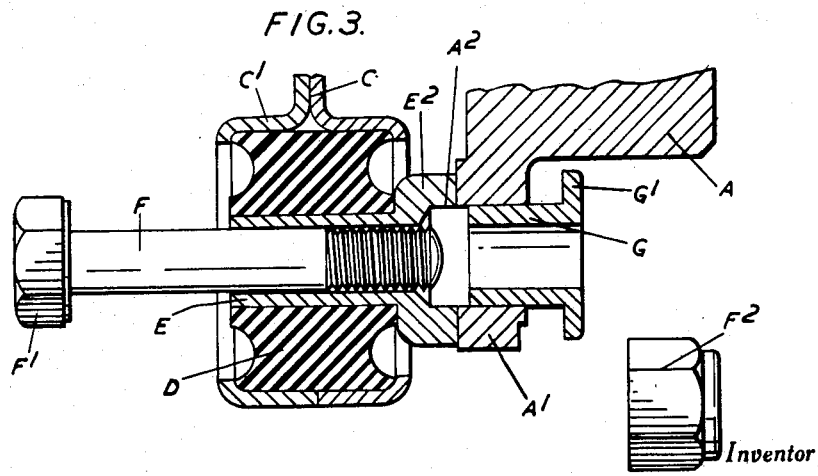
Inventor
STANLEY J. C. GRAHAM
By Emery, Holcombe & Blair
Attorneys April 24, 1956 S. J. G. GRAHAM 2,742,770
SPIGOT OR DOWEL CONNECTIONS
Filed Oct. 1, 1951 3 Sheets-Sheet 2

Inventor
STANLEY J.G.GRAHAM
By Emery, Holcombe & Blair
Attorneys

United States Patent Office 2,742,770
Patented Apr. 24, 1956

2,742,770

SPIGOT OR DOWEL CONNECTIONS

Stanley Joseph George Graham, London, England, assignor to Silentbloc Limited, London, England, a British company Application October 1, 1951, Serial No. 249,035

Claims priority, application Great Britain October 5, 1950

4 Claims. (Cl. 64—11)

This invention relates to spigot or dowel connections between two parts lying face to face and secured to one another by a bolt or bolts passing through them and of the kind in which the spigot or dowel connection comprises a tubular spigot or dowel surrounding the bolt or each bolt and either lying partly in each of two coaxial cylindrical bores formed respectively in the adjacent faces of the two parts or formed on the end of one part and extending into a cylindrical recess surrounding the bolt in the other part so as to prevent relative lateral movement between these parts.

Such spigot or dowel connections may be used for example either where it is inconvenient or undesirable to make the bolts and their holes sufficiently accurately to permit reliance to be placed on the locating action of the bolts alone to prevent relative lateral movement between the parts or where it is desirable to provide spigot or dowel devices of larger diameter than the bolts.

As at present made spigot or dowel connections of the kind referred to above comprise either short tubular dowels surrounding the part of the bolt or each bolt adjacent to the mating faces of the parts to be connected and lying in an annular chamber formed by two coaxial annular recesses formed respectively in the two parts, or short tubular projections each projecting from the mating face of one of the parts extending into an annular recess formed around a bolt in the mating face of the other part. With either of such arrangements it will be seen that during dismantling after the bolt or bolts have been withdrawn the adjacent faces of the two parts have to be separated from one another to withdraw the dowels from the annular recesses in at least one of the two parts before these parts can be moved laterally relatively to one another. In many assemblies this may not be of any consequence but in other cases it may be desirable or necessary to be able to move the members laterally relatively to one another after the bolt or bolts have been withdrawn without first having to separate their adjacent faces, as, for example, in the case of an auxiliary device mounted upon an engine and carrying one of the parts while the engine carries the other, the arrangement being such that the removal or replacement of the auxiliary device without dismantling other parts necessitates moving it laterally out of or into position without appreciable movement of the mating faces of the two parts away from and towards one another in a direction at right angles to their planes. The invention is particularly but not exclusively applicable to such arrangements and has for one of its objects to enable the two parts between which the spigot or dowel connection is arranged to be brought into position for bolting together and disengaged from one another after removal of the bolt or bolts by lateral movement without appreciable movement in a direction at right angles to the planes of their mating faces.

According to the present invention a spigot or dowel connection between two parts lying face to face and secured by a bolt or bolts passing through such parts comprises a tubular spigot or dowel member which surrounds that portion of the bolt or each bolt which passes through one of the parts and extends through such part into a recess around the adjacent portion of the bolt in the other part, this tubular spigot or dowel member being removable by withdrawal through the part through which it extends without separating the two parts.

It will thus be seen that the tubular spigot or dowel member or each of such members can be withdrawn through one of the two parts which it connects while the parts are still lying face to face and that when the bolts are also withdrawn the two parts can then be moved laterally relatively to one another. Similarly the two parts can be brought into position for the insertion of the tubular spigot or dowel members by lateral movement, and the bolts and the spigot or dowel members then inserted.

In one convenient arrangement according to the invention the tubular spigot or dowel member or each tubular spigot or dowel member is constituted by a tubular extension formed on a nut engaging the screwthreaded end of the bolt and serving with the bolt to clamp the two parts to one another.

In an alternative arrangement according to the invention the tubular spigot or dowel member or each tubular spigot or dowel member is in the form of a tubular bush having a flange at its outer end which bears on the outer face of the part through which it passes and upon which a nut on the screwthreaded end of the bolt bears (or alternatively on which the bolt head bears).

In this case the flange preferably has one or more recesses formed in the outer circumferential part of the face thereof which lies in contact with the outer face of the part through which it passes so as to enable the end of a screwdriver or the like to be inserted beneath the flange to facilitate withdrawal of the tubular spigot or dowel member. Alternatively or in addition the flange may be provided with two or more screwthreaded holes passing therethrough with their axes parallel to the axis of the tubular spigot or dowel member, for the receipt of withdrawal screws which it will be seen can be screwed through the holes so as to bear on the outer face of the part through which the tubular spigot or dowel member passes and thus lift the flange from such face.

Figure 4:
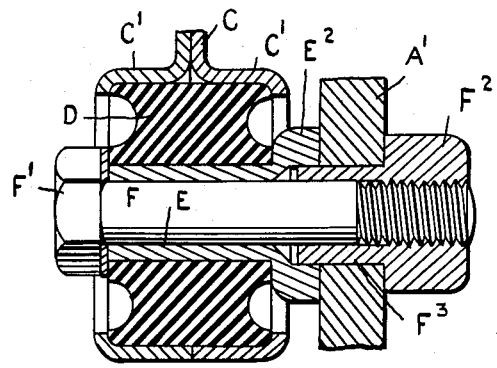

The invention may be applied to spigot or dowel connections of the kind referred to wherever convenient but one particularly convenient application of the invention is to flexible transmission couplings such as are used for example for driving a pump or other auxiliary device from an electric motor or a compression ignition internal combustion or other engine and of the kind including driving and driven members connected by flexible connecting members each comprising a rubber bushing having its axis parallel to but displaced from the axis of rotation of the coupling the rubber bushing being disposed in a socket in one of the members which it connects and having a sleeve within its bore which is clamped by a bolt to the other of these members. In such a flexible transmission coupling the coupling will generally comprise three parts, namely two end parts formed for connection respectively to a driving member on the engine and to the shaft of the pump or like auxiliary device, and an intermediate part which is connected to each of the two end parts by two or more rubber bushings in the manner described, and a tubular spigot or dowel connection according to the invention may be provided between the appropriate end of each sleeve and the member to which it is clamped by its associated bolt. For the sake of illustration therefore a form of the invention as applied to such a coupling and certain modifications thereof are illustrated by way of example in the accompanying drawings, in which:

Figure 1 is a side elevation of a coupling of the kind referred to, partly in cross section on the line 1—1 of Figure 2, to show the manner in which the invention is applied thereto, Figure 2 is an end elevation of the coupling shown in Figure 1, Figure 3 is a scrap view in cross section of part of the coupling shown in Figures 1 and 2 with the parts in a partially dismantled state to show how the invention facilitates disconnection of the parts of the coupling, Figure 4 is a scrap view in cross section showing a modification according to the invention which may be employed in some cases, and Figures 5, 6, 7 and 8 show in cross section four further modifications according to the invention.

In the construction of coupling shown in Figures 1, 2 and 3 the coupling comprises driving and driven members A and B each comprising a boss, for connection respectively to a driving shaft on the electric motor and the shaft of a pump, and two diametrically opposite radial lugs, $A^1$, $B^1$, each having a hole, $A^2$, $B^2$, therethrough with its axis parallel to the axis of the coupling as a whole. Lying between the driving and driven members A and B is an intermediate member C of disc-like form having formed therein four tubular sockets $C^1$ with their axes spaced from the axis of rotation of the coupling as a whole by a distance equal to the corresponding displacement of the holes $A^2$, $B^2$ in the lugs $A^1$ and $B^1$ on the driving and driven members. These sockets $C^1$ are evenly spaced around the axis of the coupling and each has mounted in it a rubber bushing D, the outer circumferential surface of which is bonded to the inner circumferential surface of the socket or to that of a sleeve rigidly mounted therein. Disposed within the bore of each rubber bushing D is a metal sleeve E or $E^1$ which is connected to the bore of the bushing D by bonding.

The sleeves E in one diametrically opposite pair of bushings project beyond the ends of the bushings adjacent to the driving member A and have these ends formed of enlarged diameter as shown at $E^2$ while the sleeves $E^1$ in the other diametrically opposite pair of bushings project beyond the ends of the bushings adjacent to the driven member and have these ends formed of enlarged diameter as shown at $E^3$.

The holes $A^2$ and $B^2$ in the lugs on the driving and driven members A and B are as shown of larger diameter than the bores of the smaller diameter parts of the sleeves, which lie within the bushings D, for example of approximately the diameter of the outer circumference of these parts of the sleeves, but the larger diameter end $E^2$ or $E^3$ of each sleeve has a bore equal in diameter to that of the holes $A^2$ and $B^2$ in the lugs $A^1$ and $B^1$ on the driving and driven members.

Thus, as will be seen, when the end faces of the enlarged ends $E^2$ or $E^3$ of a pair of sleeves lie in engagement with the adjacent faces of the lugs $A^1$ or $B^1$ on the driving or driven member with the bores $A^2$ or $B^2$ coaxial with the sleeves, the bores in the enlarged ends $E^2$ or $E^3$ of the sleeves form in effect short continuations of the holes $A^2$ or $B^2$.

Bolts F pass through the holes $A^2$ and $B^2$ in the lugs and the bores of the sleeves E and $E^1$ of a diameter such as to make a free fit with the smaller diameter parts of the bores of the sleeves E and $E^1$, the bolt heads $F^1$ bearing on the smaller diameter ends of the sleeves so that the screwthreaded ends of the bolts pass through the holes $A^2$ and $B^2$ lying partly in each hole $A^2$ or $B^2$ and partly in the bore in the adjacent enlarged end $E^2$ or $E^3$ of its associated sleeve is a tubular spigot or dowel member G in the form of a bush making a close fit with the hole and bore referred to and a free fit with the bolt F passing through it. Each bolt F carries at its screwthreaded end a nut $F^2$ acting on a flange $G^1$ on the associated dowel member G which thus acts as a washer between the nut and the lug $A^1$ or $B^1$ to which the sleeve E or $E^1$ is therefore firmly clamped by its associated bolt.

Referring to Figure 3, it will thus be seen that when the nuts $F^2$ have been removed from the bolts F associated with either the driving or the driven member the dowel members G can be withdrawn partially or wholly and the bolts can be wholly or partially withdrawn, whereupon the pump or the like carrying the driven member B can be removed simply by moving it laterally without any appreciable axial movement of its shaft relatively to the driving shaft.

In a modified arrangement, which may otherwise be similar to that described above, instead of employing separate dowel members G, $G^1$ each nut F may have a tubular extension $F^3$ formed thereon as shown in Figure 4, this extension constituting the dowel member.

In another modification the bore of the tubular dowel member G, $G^1$ may be screwthreaded and the bolt F provided with a greater length of screwthread to engage this bore, in which case the flange $G^1$ may be provided with means by which it can be held from rotation when screwing the bolt into or out of it.

Figure 5:
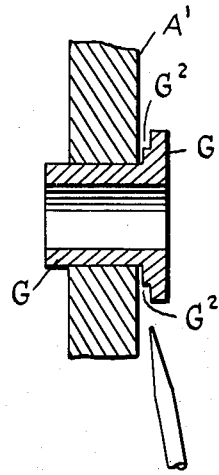
Figure 6:
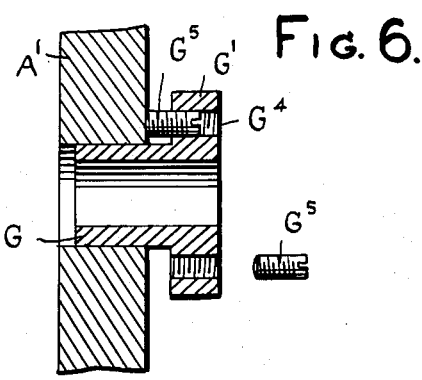

In a further modification also employing a separate tubular bush G, $G^1$ the flange $G^1$ has one or more recesses $G^2$ in the circumferential portion of the face which lies against the lug as indicated in Figure 5 for the insertion of a screwdriver or the like to facilitate removal while in another modification the flange $G^1$ is provided with two screwthreaded bores $G^4$ to receive extraction screws $G^5$ for withdrawing the bushes from the bore in which it lies, when required.

Figure 7:
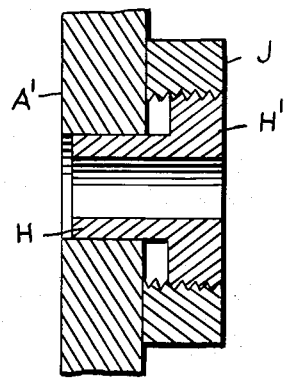
Figure 8:
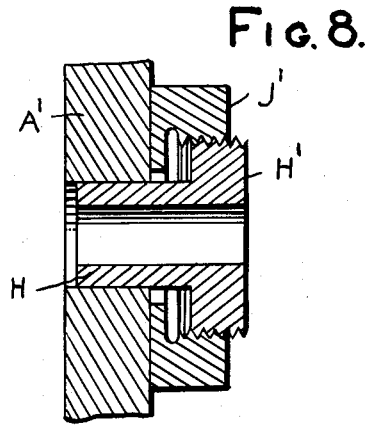

In the still further modifications shown in Figures 7 and 8, in each of which the dowel is shown in its withdrawn position, the dowel H has a flange $H^1$ which is externally screwthreaded and engaged by an internally screwthreaded withdrawing ring or nut J or $J^1$. This withdrawing ring may either be "free" as shown at J in Figure 7 or "trapped" as shown in Figure 8 so that when the dowel is in its withdrawn position the ring $J^1$ is prevented from becoming detached except with the dowel which will usually be a force fit in its bore.

It will be understood that the invention may be applied in a similar manner to that described above to flexible transmission couplings of the same general kind as that described but in which the rubber bushings are connected to their sockets and sleeves by adhesion due to radial compression and that, although the invention has been described with particular reference to flexible transmission couplings it can be applied to a wide variety of apparatus where a spigot or dowel connection of the kind referred to is desirable, and that the arrangement and form of the withdrawable tubular spigot or dowel members and the provisions for facilitating withdrawal may also vary considerably.

What I claim as my invention and desire to secure by Letters Patent is:

1. A spigot connection comprising a bolt, a nut on said bolt, a tubular spigot member closely surrounding and slidably engaging said bolt, a first part provided with a hole of substantially the same diameter as the exterior of said tubular spigot member, a second part lying face to face against said first part and provided with a coaxial hole having at the end nearest said first part a larger portion of substantially the same diameter as the exterior of said tubular spigot member, and a smaller portion more remote from said first part of substantially the same diameter as the interior of said tubular spigot member, said spigot member passing with a close sliding fit completely through said first part by means of the hole therein and entering into said second part by means of the larger portion of the hole therein, said tubular spigot member having a flange thereon which lies against the face of the first part remote from the second part and limits its travel through the first part, while the head of the bolt and the nut act, one on the outer face of the flange and the other on the end face of the second part remote from the first part, the flange thus constituting means by which the spigot member can be withdrawn from the second part after withdrawal of the bolt.

2. A spigot connection as claimed in claim 1 connecting the driving and driven members of a flexible transmission coupling, said connection comprising a resilient bushing having its axis parallel to but displaced from the axis of rotation of the coupling, the resilient bushing being disposed in a socket in one of the members and having a sleeve within its bore, said sleeve constituting the second part of said spigot connection and the other transmission member constituting the first part thereof.

3. In a flexible transmission coupling including driving and driven transmission members mounted in axial alinement and connected by flexible means in an axial space between said transmission members, said means comprising rubber or like resilient bushings having their axes parallel to but displaced from the axis of rotation of the coupling, each said resilient bushing being disposed in a socket concentric therewith in said flexible means, wherein each of said bushings has within its bore a rigid sleeve provided with a cylindrical recess in its end which is clamped in juxtaposition to one of said transmission members by a bolt passing through said sleeve from its opposite end with its threaded end passing through said juxtaposed transmission member, the combination with each sleeve and its juxtaposed transmission member of a separable tubular spigot member surrounding and slidably engaging that part of the bolt which passes through said juxtaposed transmission member, said spigot member extending through said transmission member from the opposite direction to that of the bolt and into said cylindrical recess, and means for retaining said spigot member and bolt against separation axially, said spigot member being removable upon disengaging said retaining means by withdrawal from said juxtaposed transmission member, thereby permitting sufficient lateral displacement of said resilient bushings and sleeves to enable withdrawal of said flexible means from said space.

4. A flexible transmission coupling as claimed in claim 3 in which the end of each sleeve which is clamped to the appropriate transmission member is enlarged in external diameter as compared with the part of the sleeve which is surrounded by and engages the rubber bushing.

References Cited in the file of this patent

UNITED STATES PATENTS

| | | |
|---|---|---|
| 1,978,939 | Guy | Oct. 30, 1934 |
| 2,122,837 | Guy | July 5, 1938 |
| 2,352,487 | McNaman | June 27, 1944 |
| 2,377,468 | Venditty | June 5, 1945 |
| 2,565,606 | Guy | Aug. 28, 1951 |